(12) United States Patent
Liu et al.

(10) Patent No.: US 11,613,254 B2
(45) Date of Patent: Mar. 28, 2023

(54) METHOD TO MONITOR CONTROL SYSTEM OF AUTONOMOUS DRIVING VEHICLE WITH MULTIPLE LEVELS OF WARNING AND FAIL OPERATIONS

(71) Applicant: Baidu USA LLC, Sunnyvale, CA (US)

(72) Inventors: Xiaodong Liu, Sunnyvale, CA (US); Ning Qu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 227 days.

(21) Appl. No.: 16/440,983

(22) Filed: Jun. 13, 2019

(65) Prior Publication Data
US 2020/0391729 A1    Dec. 17, 2020

(51) Int. Cl.
*B60W 30/09*    (2012.01)
*B60W 30/095*    (2012.01)
(Continued)

(52) U.S. Cl.
CPC ............ *B60W 30/09* (2013.01); *B60W 30/08* (2013.01); *B60W 30/0953* (2013.01);
(Continued)

(58) Field of Classification Search
CPC ............ B60W 30/09; B60W 30/0953; B60W 30/0956; B60W 60/0018; B60W 2552/05;
(Continued)

(56) References Cited

U.S. PATENT DOCUMENTS

2009/0048768 A1*  2/2009  Taguchi ............... G08G 1/166
                                                                                          701/117
2015/0151725 A1*  6/2015  Clarke .............. B60W 30/143
                                                                                          701/28
(Continued)

FOREIGN PATENT DOCUMENTS

WO    WO-2019228776 A1 *  12/2019  ............ B60W 50/02

OTHER PUBLICATIONS

M. Shiraishi, H. Sumiya and Y. Tsuchiya, "Crash zones based on driver's collision avoidance operation for ITS," Proceedings. The IEEE 5th International Conference on Intelligent Transportation Systems, Singapore, 2002, pp. 210-215, doi: 10.1109/ITSC.2002. 1041216. (Year: 2002).*

*Primary Examiner* — Abby Y Lin
*Assistant Examiner* — Danielle Marie Jackson
(74) *Attorney, Agent, or Firm* — Womble Bond Dickinson (US) LLP

(57) ABSTRACT

According to one embodiment, a motion trajectory boundary is obtained based on a trajectory that has been planned to drive an ADV for a next time period. A safe driving area boundary is determined for the ADV based on perception data perceiving a driving environment surrounding the ADV. The motion trajectory boundary and the safe drivable area boundary are projected onto a map such as an HD map. A relative location of the ADV within the map relative to the motion trajectory and the safe drivable area boundary is determined. A fail-safe action or a fail operational action may be performed based on the relative location of the ADV (Continued)

in view of the motion trajectory boundary and the safe drivable area boundary.

20 Claims, 11 Drawing Sheets

(51) Int. Cl.
  *B60W 60/00* (2020.01)
  *B60W 30/08* (2012.01)
  *G05D 1/02* (2020.01)
  *G05D 1/00* (2006.01)
  *B60W 50/029* (2012.01)

(52) U.S. Cl.
  CPC ...... *B60W 30/0956* (2013.01); *B60W 50/029* (2013.01); *B60W 60/0011* (2020.02); *B60W 60/0015* (2020.02); *G05D 1/0077* (2013.01); *G05D 1/0214* (2013.01); *B60W 2050/0292* (2013.01); *B60W 2552/10* (2020.02); *B60W 2554/80* (2020.02); *B60W 2555/60* (2020.02); *G05D 2201/0213* (2013.01)

(58) Field of Classification Search
  CPC ......... B60W 2552/53; B60W 60/0027; B60W 2520/10; B60W 2754/10; B60W 60/0015; B60W 60/0011; B60W 30/08; B60W 2554/80; B60W 2555/60; B60W 2552/10; G05D 1/0214; G05D 2201/0213
  See application file for complete search history.

(56) References Cited

U.S. PATENT DOCUMENTS

| | | | |
|---|---|---|---|
| 2015/0353084 A1* | 12/2015 | Schroeder | B60W 30/0956 701/301 |
| 2018/0356819 A1* | 12/2018 | Mahabadi | B60W 30/09 |
| 2019/0367021 A1* | 12/2019 | Zhao | B60W 60/00274 |
| 2019/0385460 A1* | 12/2019 | Magzimof | G05D 1/0214 |
| 2019/0389487 A1* | 12/2019 | Gowda | G01S 13/931 |
| 2020/0139967 A1* | 5/2020 | Beller | B60W 30/18159 |
| 2021/0171062 A1* | 6/2021 | Hecker | B60W 60/0015 |
| 2022/0315020 A1* | 10/2022 | Tagesson | B60W 50/023 |

\* cited by examiner

METHOD TO MONITOR CONTROL SYSTEM OF AUTONOMOUS DRIVING VEHICLE WITH MULTIPLE LEVELS OF WARNING AND FAIL OPERATIONS

TECHNICAL FIELD

Embodiments of the present disclosure relate generally to operating autonomous vehicles. More particularly, embodiments of the disclosure relate to monitoring the control system of an autonomous driving vehicle (ADV) for safe driving.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. As one of the key functions for autonomous driving system besides localization, perception, prediction and planning, control plays a key role in translating a motion trajectory into executable motion actuator commands such as steering, acceleration, and deceleration. A common approach to ensure control function works as intended is to use time-to-collision (TTC) or a gap distance as an overall guideline to evaluate both planning and control functions. This can lead to either too aggressive or too conservative in planning and control. In addition, when a fail operation shall be activated to meet minimum risk maneuver is yet to be explored.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
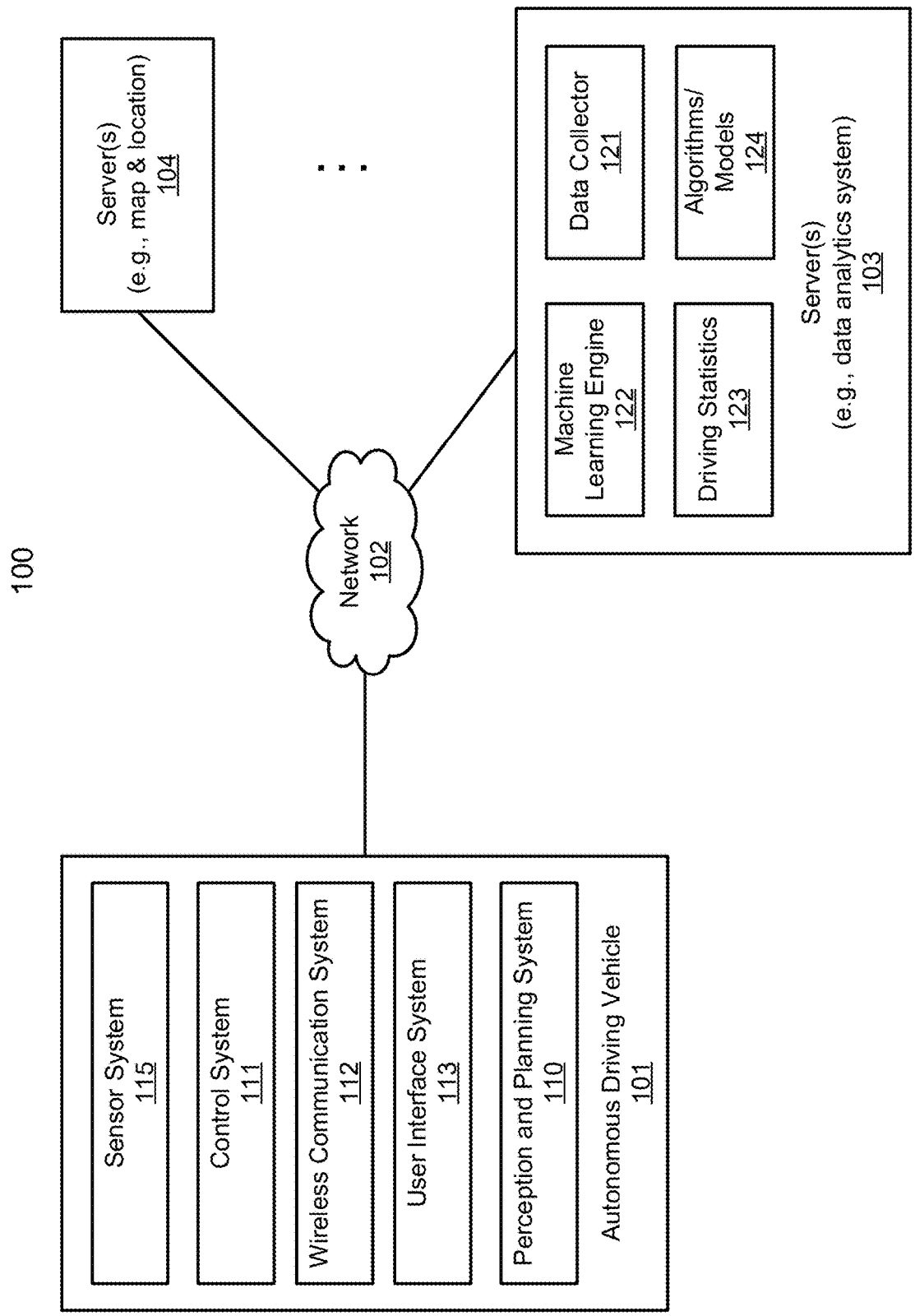
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method is provided to use a vehicle motion trajectory or motion envelope from planning as the first warning layer to monitor if the vehicle starts to deviate from the boundary, either fail safe or fail operation action depending on the scenarios can be triggered as autonomous vehicle continues to approach safe boundary. A two-layer monitor concept is utilized to ensure a control function works as intended. A motion trajectory boundary determined during planning is utilized as a first warning layer. A safe drivable area boundary (also simply referred to as a drivable area boundary) determined based on nearby obstacles and the state of the vehicle is utilized as a second warning layer to determine either a fail-safe action or fail operational action should be performed.

The motion trajectory boundary determined from planning is first projected on a high-definition (HD) map, and it is used to compare with vehicle's current location on the HD map. Vehicle's current location from a localization function is constantly used to compare with the motion trajectory boundary on the HD map. If the vehicle location indicates that the vehicle crosses the first layer and the vehicle does not slow down, a warning is issued to a control function and either fail-safe or fail operation is initiated. As the vehicle location on the HD map indicates it approaches the safe drivable area boundary, either fail safe or fail operation is activated to meet the minimum risk maneuver.

According to one embodiment, a motion trajectory boundary is obtained based on a trajectory that has been planned to drive an ADV for a next time period. A safe driving area boundary is determined for the ADV based on perception data perceiving a driving environment surrounding the ADV. The motion trajectory boundary and the safe drivable area boundary are projected onto a map such as an HD map. A relative location of the ADV within the map relative to the motion trajectory and the safe drivable area boundary is determined. A fail-safe action or a fail operational action may be performed based on the relative location of the ADV in view of the motion trajectory boundary and the safe drivable area boundary.

The motion trajectory boundary defines an area within which the ADV is expected to be located for the next time period if the ADV was driven according to the trajectory. The motion trajectory boundary is determined based on predicted movement of one or more obstacles within a predetermined proximity of the ADV in view of a current location and a current speed of the ADV according to a set of one or more driving rules. The safe drivable area boundary is determined based on a distance between the ADV and each of one or more obstacles identified based on the perception data according to a set of one or more safety clearance rules. The safe drivable area boundary is determined further based on a lane configuration of one or more lanes of a road in which the ADV is located, which may be obtained from map metadata of the map.

In one embodiment, in determining a relative location of the ADV within the map relative to the motion trajectory boundary and the safe drivable area boundary, it is determined whether the ADV is within a first predetermined proximity of the motion trajectory boundary on the map. If so, at least one of the fail-safe action or the fail operational action may be performed. In one embodiment, if it is determined that the ADV is within the first predetermined proximity, it is further determined whether the ADV is within a second predetermined proximity of the safe drivable area boundary. If not, a warning signal is generated and sent to a primary autonomous driving system (e.g., primary or active perception and planning system), and a signal is transmitted from the primary autonomous driving system to a secondary autonomous driving system (e.g., secondary or standby perception and planning system) to initiate at least one of the fail-safe action or the fail operational action. In one embodiment, if the ADV is currently located within a low speed zone of the road based on the map data, the fail-safe action is initiated; otherwise, the fail operational action is initiated.

In one embodiment, if the ADV is located within the second predetermined proximity and the ADV is currently located in the low speed zone, the secondary autonomous driving system is activated to perform the fail-safe action; otherwise, the secondary autonomous driving system is activated to perform the fail operational action. The fail-safe action includes slowing down and/or stopping the ADV within the current lane. The fail operational action includes driving the ADV according to an alternative trajectory planned by the secondary autonomous driving system.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
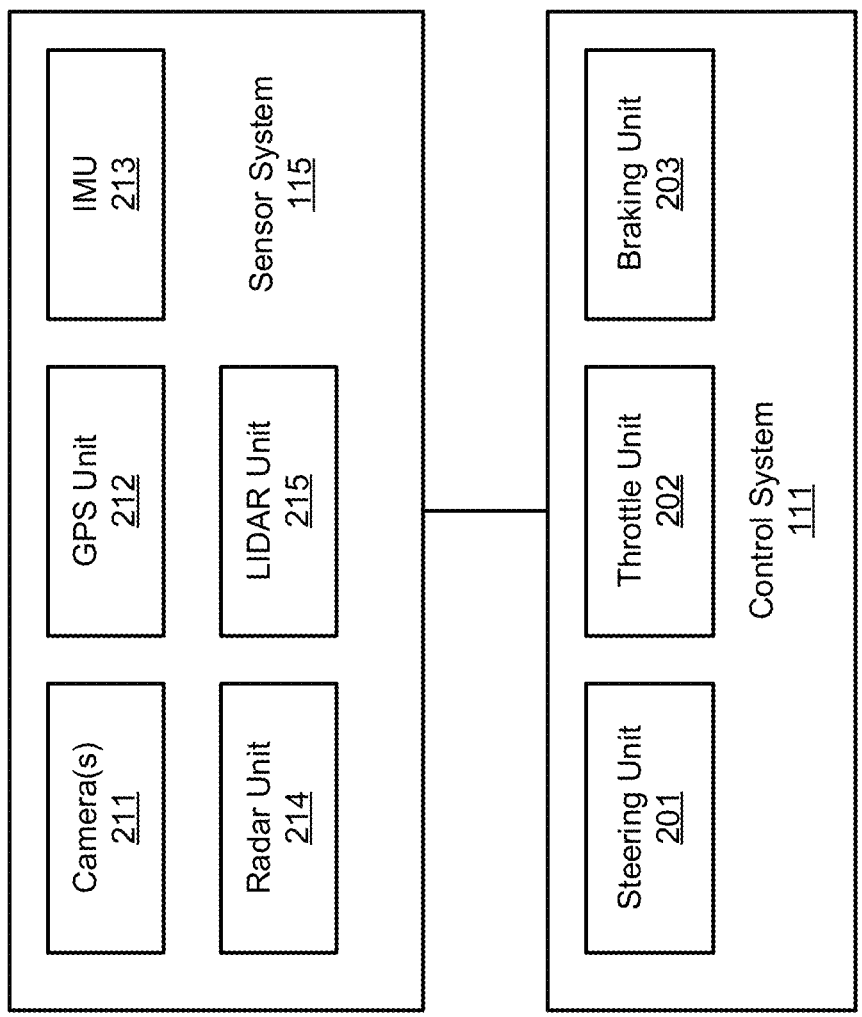
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm to determine a safe drivable area boundary based on perception data, an algorithm to determine whether and when a fail-safe action or a fail operational action should be performed. Algorithms 124 can then be uploaded on ADVs to be utilized during autonomous driving in real-time.

Figure 3A:
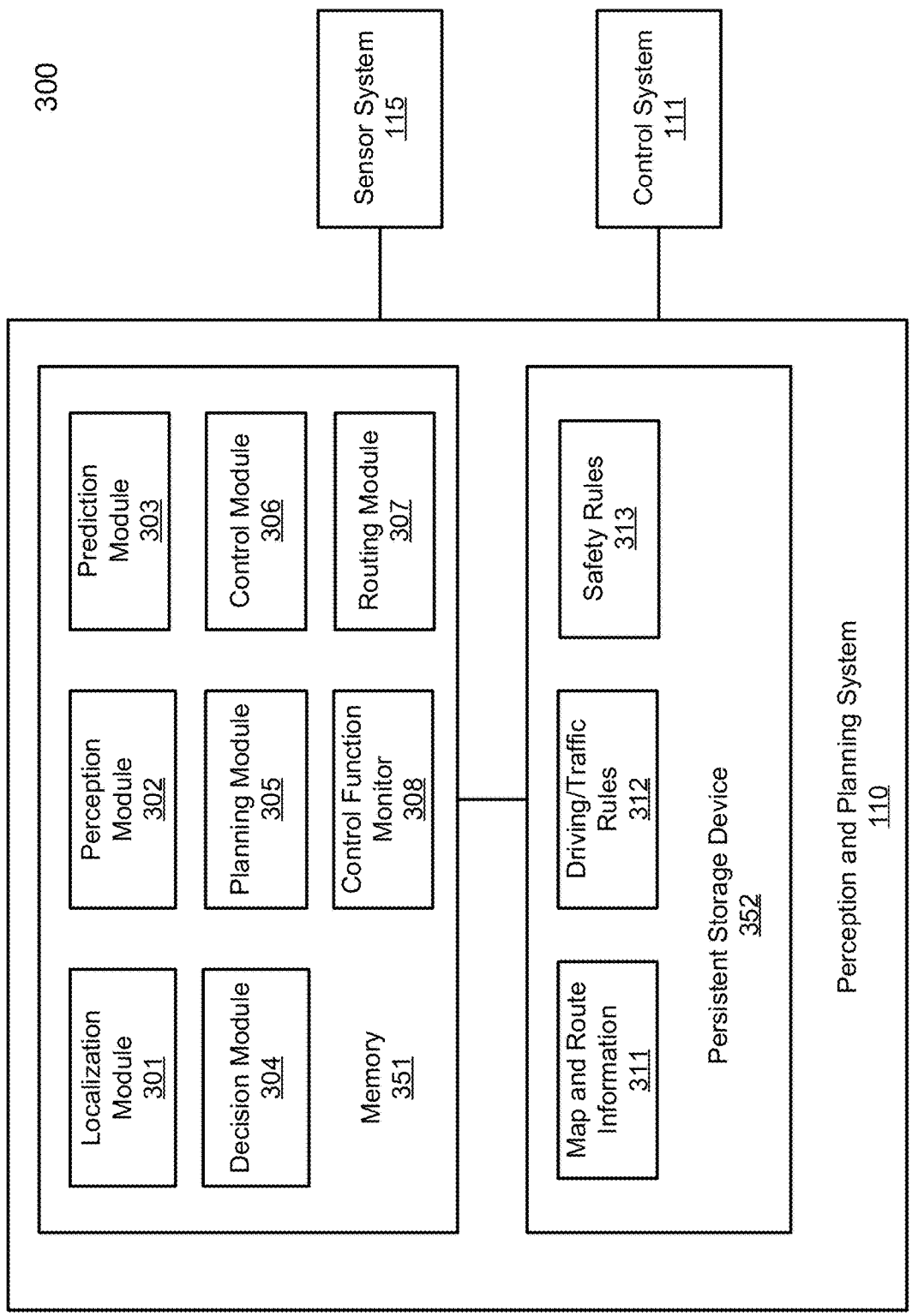
FIGS. 3A-3B are block diagrams illustrating an example of a perception and planning system used with an autonomous vehicle according to one embodiment.
Figure 3B:
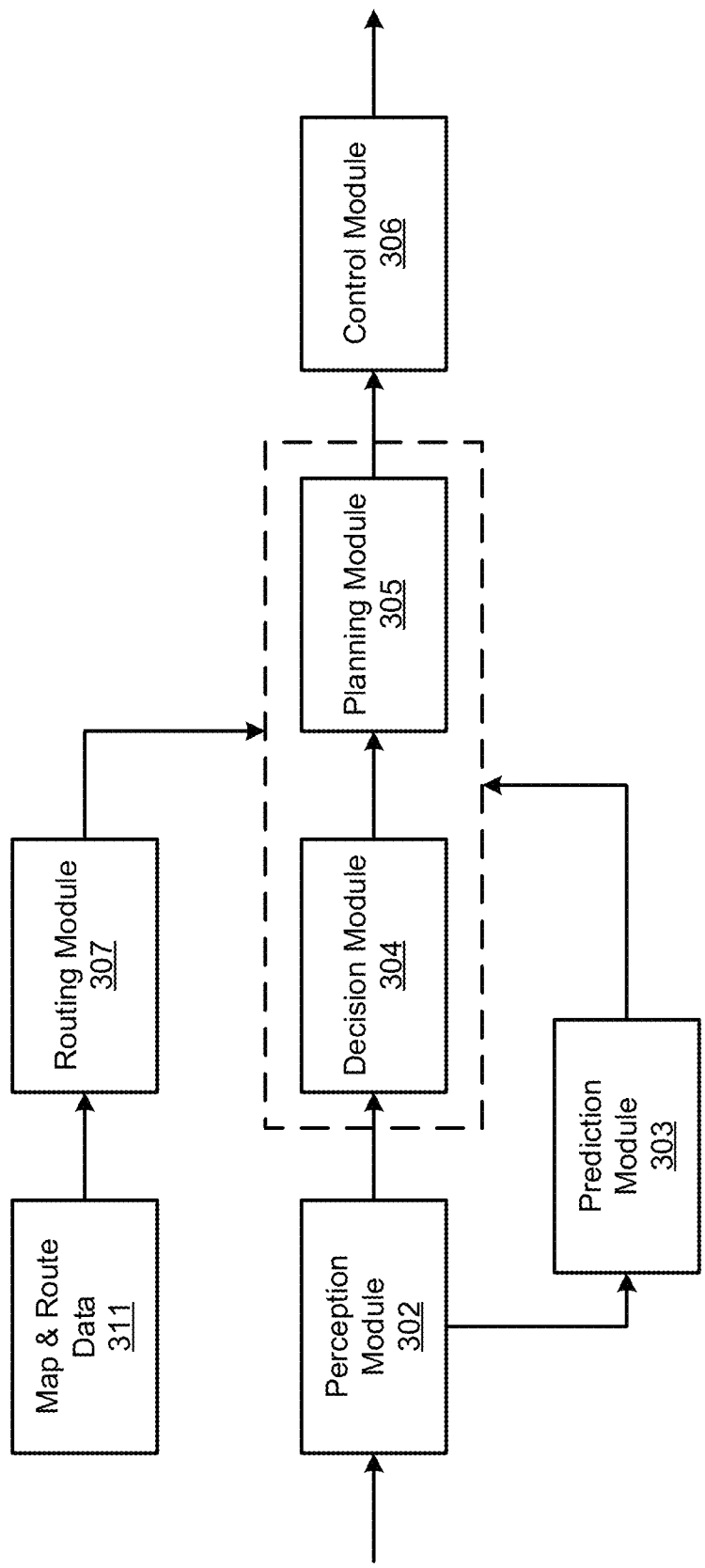

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and control function monitor 308 (also simply referred to as function monitor or monitor).

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, control function monitor 308 is communicatively coupled to some or all of modules 301-307 to monitor the operations or results of at least some of the modules, such as, control module 306, to determine whether such modules may malfunction. One of the purposes of function monitor 308 is to detect whether any of the modules 301-307 may fail to operate for safety reasons. If there is a possible malfunction of any modules, monitor 308 may initiate and activate a safety plan according to a set of safety rules 313. In one embodiment, if a malfunction of a primary autonomous driving system is detected, a secondary autonomous driving system may be activated to take over the control of the ADV to at least put the ADV in a safer condition or state.

Figure 4:
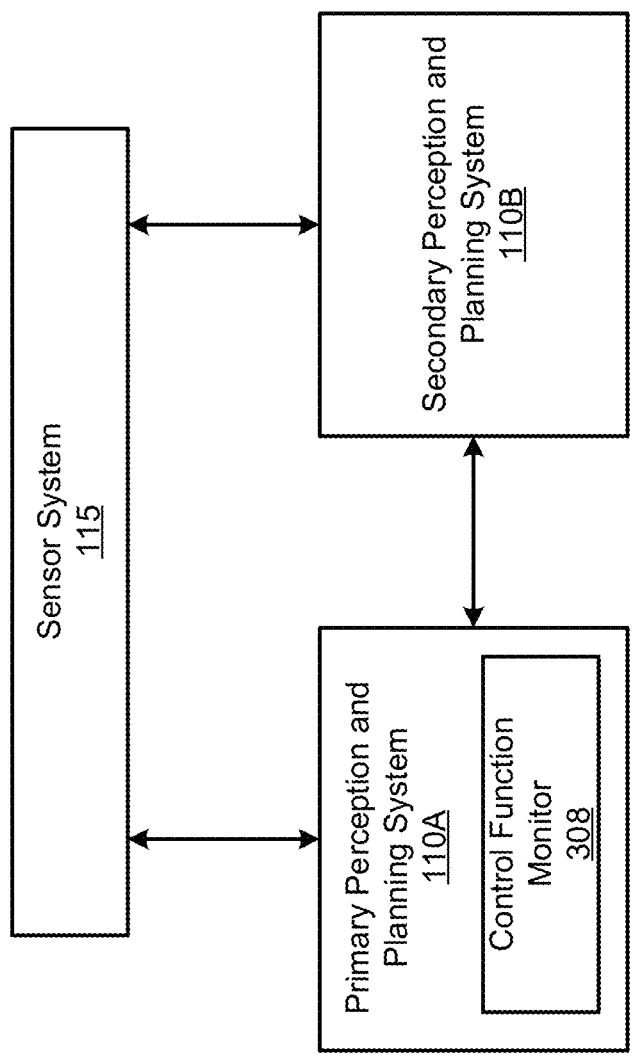
FIG. 4 is a block diagram illustrating an example of an autonomous driving system according to one embodiment.
Figure 5:
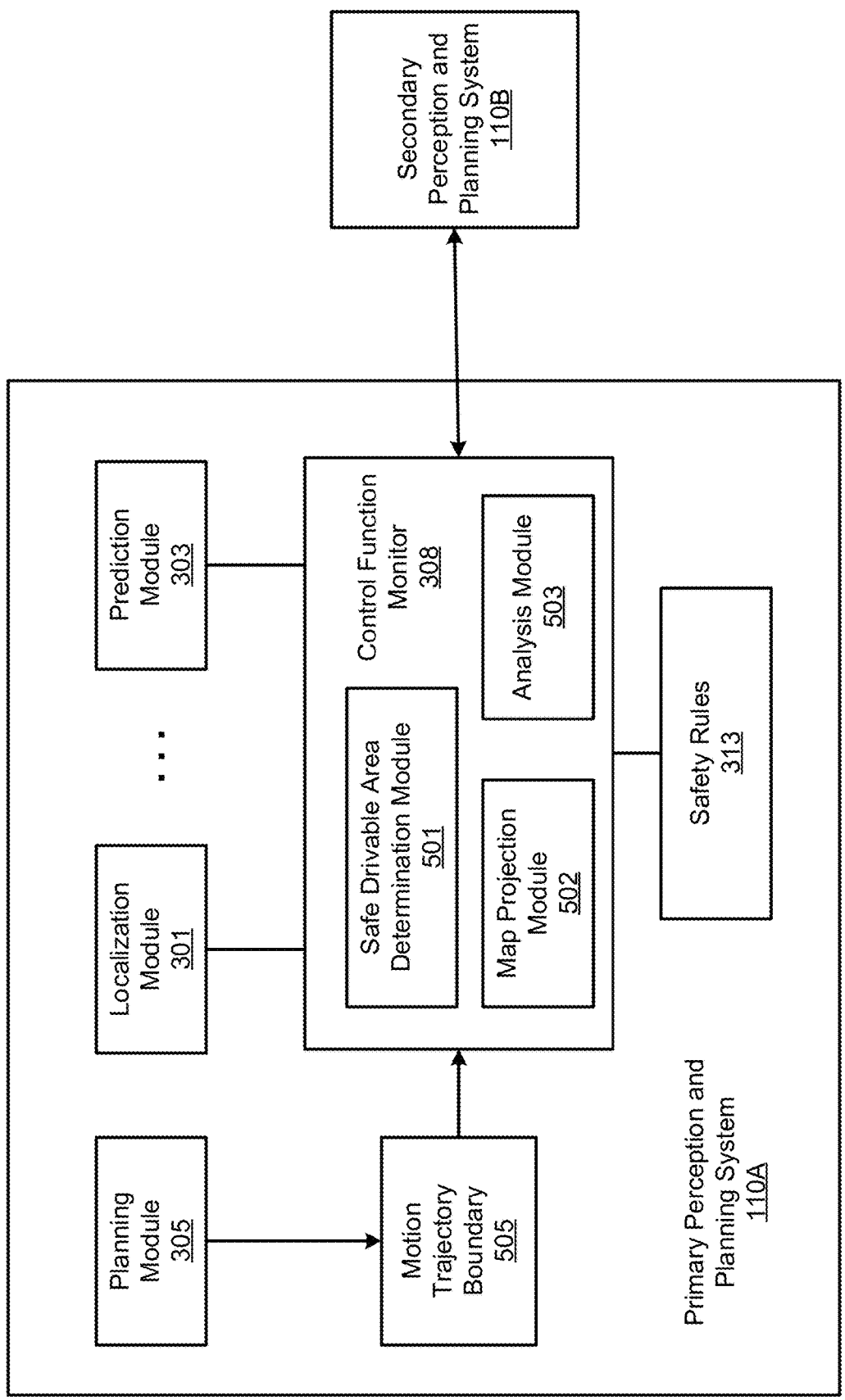
FIG. 5 is a block diagram illustrating an example of a control function monitor according to one embodiment.

Referring now to FIG. 4, according to one embodiment, an ADV includes at least two autonomous driving systems: 1) primary/active autonomous driving system 110A and 2) secondary/standby autonomous driving system 110B. Each of the systems 110A-110B may include the same or similar functionalities or modules as shown in FIG. 3. During the normal operations of the vehicle, primary system 110A is active and in charge of planning and controlling the vehicle, while secondary system 110B is operating in a standby mode. However, according to one embodiment, although secondary system 110B operates in a standby mode, secondary system 110B may still perform some or most of the operations as performed by primary system 110A, including perception, prediction, decision, and planning processes. But the results of the processes of secondary system 110B are not utilized (e.g., generating control commands) to control the vehicle while the second system 110B operates in a standby mode.

Control function monitor 308 is configured to monitor the operations of certain functions such as control functions of control module 306 to determine whether a control function malfunctions using a set of safety rules. In response to detecting that a control function fails to perform as planned, control function monitor 308 may alert at least some of the modules in primary system 110A. In addition, control function monitor 308 transmits a signal or command to secondary system 110B via a communication link (e.g., PCIe link) to instruct the secondary system 110B to initiate or activate a backup plan such as a fail-safe action or a fail operational action, such that secondary system 110B can take over the control of the vehicle.

According to one embodiment, control function monitor 308 includes, but is not limited to, drivable area determination module or calculator 501, map projector or projection module 502, and analysis module 503. These modules may be integrated in fewer number of modules or a single module. A motion trajectory boundary 505 is received from planning module 305. The motion trajectory boundary may be determined based on a trajectory that has been planned by planning module 305 to drive an ADV for a next time period (e.g., planned by the current planning cycle to be utilized in a next planning cycle). Alternatively, the motion trajectory boundary 505 may be determined by a motion trajectory boundary calculator of monitor 308 based on a trajectory data representing a trajectory provided by planning module 305.

Drivable area determination module 501 determines a safe driving area boundary for the ADV based on perception data perceiving a driving environment surrounding the ADV provided by perception module 301 and/or localization module 302, as well as other data such as prediction data provide by prediction module 303 and decision data provided by decision module 304. The safe drivable area boundary may be determined based on the relative locations in view of other obstacles perceived nearby. Map projector 502 projects the motion trajectory boundary and the safe drivable area boundary onto a map such as an HD map. Analysis module 503 is configured to determine a relative location of the ADV within the map relative to the motion trajectory and the safe drivable area boundary. Based on the analysis, analysis module 503 may determine that a fail-safe action or a fail operational action may be performed based on the relative location of the ADV in view of the motion trajectory boundary and the safe drivable area boundary. If it is determined that a fail-safe action or a fail operational action should be performed, analysis module 503 transmits a signal or command to secondary system 110B to instruct secondary system 110B to perform a fail-safe action or a fail operational action.

A motion trajectory boundary defines an area within which the ADV is expected to be located for the next time period if the ADV was driven according to the trajectory planned by planning module 305, given the current state of the vehicle (e.g., speed, acceleration, heading direction). The motion trajectory boundary may be determined based on predicted movement of one or more obstacles within a predetermined proximity of the ADV in view of a current location and a current speed of the ADV according to a set of one or more driving rules.

According to one embodiment, a safe drivable area boundary is determined based on a distance between the ADV and each of one or more obstacles identified based on the perception data according to a set of one or more safety clearance rules. The safe drivable area boundary is determined further based on a lane configuration of one or more lanes of a road in which the ADV is located, which may be obtained from map metadata of the map. For example, if the map data indicates that there is another lane, the safe drivable area boundary may cover that particular lane based on the relative locations of the obstacles on that lane.

Figure 6A:
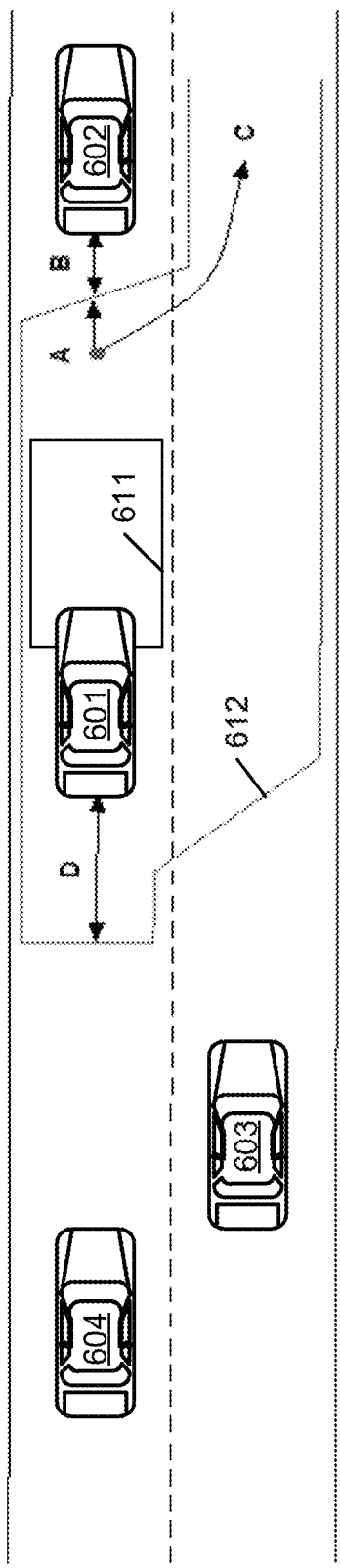
FIGS. 6A-6C are diagrams illustrating examples of control function monitoring operations according to certain embodiments.

In one embodiment, in determining a relative location of the ADV within the map relative to the motion trajectory boundary and the safe drivable area boundary, where motion trajectory boundary shall always be within safe drivable area boundary during normal operations, analysis module 503 determines whether the ADV is outside of a first predetermined proximity of the motion trajectory boundary on the map (e.g., not close to Point A in FIG. 6A). If so, at least one of the fail-safe action or the fail operational action may be initiated, at the same time, warning shall be issued to control function to perform controlled stop. In one embodiment, if it is determined that the ADV is within the first predetermined proximity, if not, a warning signal is generated and sent to other modules of the primary autonomous driving system 110A, and a signal is transmitted from the primary autonomous driving system to the secondary autonomous driving system 110B to initiate at least one of the fail-safe action or the fail operational action. In one embodiment, if the ADV is currently located within a low speed zone of the road based on the map data, the fail-safe action is initiated; otherwise, the fail operational action is initiated. A low speed zone refers to a zone of which a speed limit is below a predetermined limit (e.g., 25 or 35 miles per hour), which may be obtained from the map data of the map.

In one embodiment, if the ADV is located within the second predetermined proximity of the safe drivable area boundary (e.g., close to point A in FIG. 6C) and the ADV is currently located in the low speed zone, the secondary autonomous driving system 110B is activated to perform the fail-safe action; otherwise, the secondary autonomous driving system 110B is activated to perform the fail operational action. The fail-safe action includes slowing down and/or stopping the ADV within the current lane or parking the ADV within a parking space associated with the current lane. The fail operational action includes driving the ADV according to an alternative trajectory planned by the secondary autonomous driving system, for example, to proceed to at least the side of the road.

For illustration purpose, referring now to FIG. 6A, in this example, ADV 601 is moving within the left lane. Based on perception, there are three vehicles 602-604 moving at certain speeds at different locations. Vehicle 602 is moving in front of ADV 601 and vehicle 603 is moving behind ADV 601, while vehicle 603 is moving on the right lane. Based on the perception data receiving a driving environment surrounding ADV 601 (e.g., vehicles 602-604, lane configuration of the left lane and right lane), planning module 305 plans a trajectory to drive ADV 601 for a next time period. Based on the trajectory, motion trajectory boundary 611 is determined. Motion trajectory boundary 611 defines an area within which ADV 601 should be located during the normal operations (e.g., no malfunction occurs). That is, if ADV 601 is located outside of motion trajectory boundary 611, at least one of the modules 301-307 may operate abnormally. Motion trajectory boundary 611 may be determined by planning module 305 or alternatively, it can be determined by monitor 308 based on a trajectory provided by planning module 305.

According to one embodiment, based on the driving environment, a safe drivable area boundary 612 is determined in view of vehicles 602-604. Safe drivable area boundary 612 defines an area within which ADV 601 can move unlikely colliding with vehicles 602-604, given the current states of ADV 601 and vehicles 602-604. For example, safe drivable area boundary 612 defines the minimum distance D between ADV 601 and the following vehicle 604 based on their speeds that these two vehicles unlikely collide with each other in case the ADV takes emergency brake. Similarly, safe drivable area boundary 612 defines the minimum distance B between ADV 601 and leading vehicle 602 based on their speeds these two vehicles unlikely collide with each other when the ADV performs emergency brake.

According to one embodiment, control function monitor 308 periodically or constant monitors the performance of at least some of modules 301-307 based on the ADV's location relative to motion trajectory boundary 611 and safe drivable area boundary 612. For each planning cycle, control function monitor 308 receives motion trajectory boundary 611 from planning module 305. In addition, control function monitor 308 receives perception data perceiving a driving environment surrounding ADV 601. Based on the perception data, control function monitor 308 determines safe drivable area boundary 612 using a set of safety rules. Safe drivable area boundary 612 may be determined based on the relative locations of vehicles 602-604 and their speeds with respect to the location and speed of ADV 601.

The motion trajectory boundary 611 and safe drivable area boundary 612, as well as the location of ADV 601 are projected onto a map such as an HD map. On the map, the location of ADV 601 is compared with the motion trajectory boundary 611 and/or safe drivable area boundary 612 to determine whether ADV 601 reaches the corresponding boundaries. If it is further determined that ADV 601 is within a first predetermined proximity of motion trajectory boundary 611 as shown in FIG. 6A (e.g., crossing motion trajectory boundary 611), it is determined whether ADV 601 is within a second predetermined proximity of safe drivable area boundary 612.

Figure 6B:
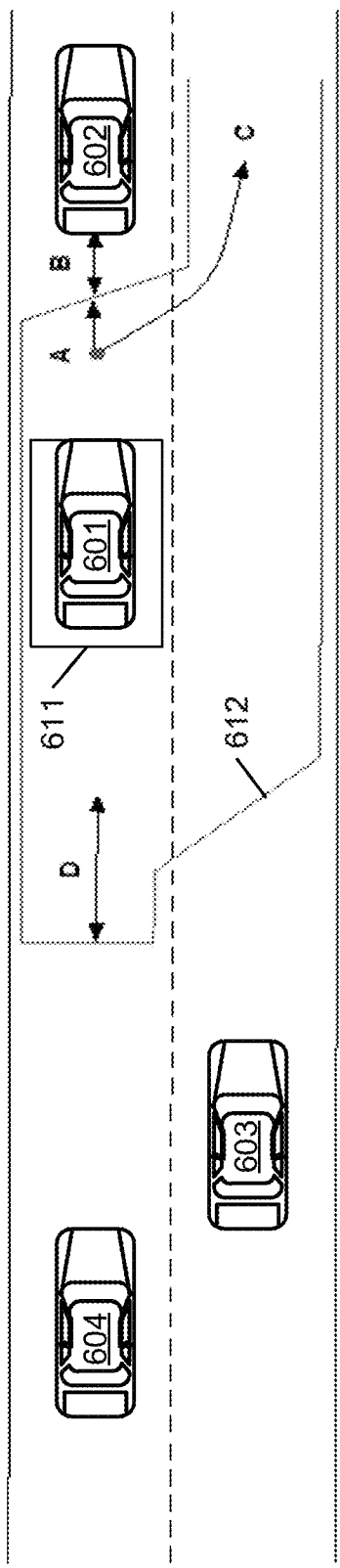

If it is determined that ADV 601 is within the second predetermined proximity, i.e. not close to point A in FIG. 6B, but it is not within the first predetermined proximity, as shown in FIG. 6B in this example, it is further determined whether ADV 601 is within a low speed zone, which may be determined based on map data provided by the map. If ADV 601 is within a low speed zone, a fail-safe action is initiated. In one embodiment, a fail-safe action includes planning and controlling the ADV to slow down and/or stop within the current lane. If ADV 601 is not in the low speed zone, a fail operational action is initiated. In one embodiment, a fail operational action includes planning and controlling the ADV to move according to an alternative trajectory or route, for example, to avoid collision with vehicle 602. In one embodiment, a signal or command is transmitted from the primary perception and planning system 110A to the secondary perception and planning system 110B to instruct the secondary perception and planning system 110B to prepare taking over the control of ADV 601 by initiating and preparing a fail-safe action and/or fail operational action.

In one embodiment, initiating a fail-safe action refers to preparing and planning slowing down and/or stopping the vehicle, for example, within the current lane, without generating and issuing control commands to control the vehicle. Similarly, initiating a fail operational action refers to preparing and planning an alternative trajectory or path to void collision with other obstacles from a current location of the ADV, without generating and issuing control commands to control the ADV.

Figure 6C:
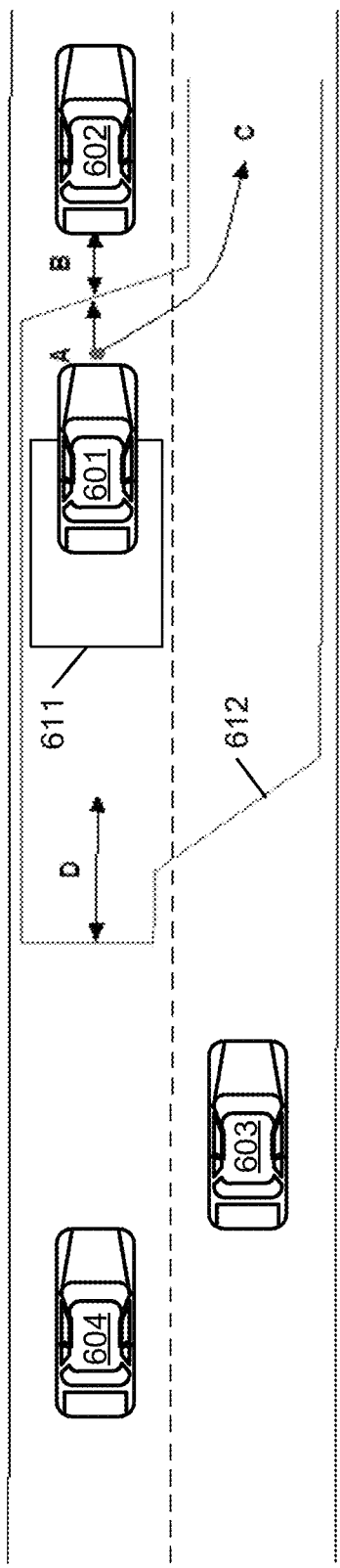

If it is determined that ADV 601 is within the first predetermined proximity of the motion trajectory boundary and is within the second predetermined proximity of the safe drivable area boundary, as shown in FIG. 6C, a fail-safe action or a fail operational action is activated. That is, a previously initiated and prepared fail-safe action or fail operational action is activated and actually performed, so that a proper control command is issued to ADV 601 by secondary system 110B to take over the control of ADV 601. Referring now to FIG. 6C, in this situation, ADV 601 has crossed the motion trajectory boundary 611 and reaches within the second predetermined proximity of safe drivable area boundary 612 at point A. Therefore, at point A, a fail-safe action or a fail operational action is activated dependent upon the circumstances.

If it is determined that ADV 601 is within the first predetermined proximity and the second predetermined proximity, according to one embodiment, it is further determined whether ADV 601 is within a low speed zone, which may be determined based on map data provided by the map. If it is determined that ADV 601 is within the low speed zone, the fail-safe action is activated, for example, by sending a signal to the secondary perception and planning system 110B to take over the control of the vehicle and perform the fail-safe action. In this example as shown FIG. 6C, the fail-safe action may cause ADV 601 to slow down and/or stop within the left lane. The rationale behind this approach is that since ADV 601 is within the low speed zone, it is safer to slow down and/or stop the vehicle because it is likely other vehicles have sufficient time to react to slow down.

If it is determined that ADV 601 is not within the low speed zone, according to one embodiment, a fail operational action is activated, for example, by sending a signal or command to secondary perception and planning system 110B to take over the control of the vehicle and perform the fail operational action. In this example as shown in FIG. 6C, the fail operational action may cause ADV 601 to move according to an alternative trajectory or path A-C to move into the right lane given the circumstances to avoid colliding with vehicle 602. The rationale behind this approach is that, if ADV 601 is not within the low speed zone, it is unsafe to drastically slow down and stop ADV 601, because a following vehicle 604 may not have sufficient time to react and may collide with ADV 601 within the left lane. In one embodiment, if ADV 601 reaches point B, a maximum break command is issued to the vehicle to perform an emergency break, because it may be too late to move to the right lane according to the alternative path. These actions may be performed according to a set of safety rules such as safety rules 313. As a result, ADV 601 can be brought to a safer state in response to detecting a failure of a control function.

Figure 7:
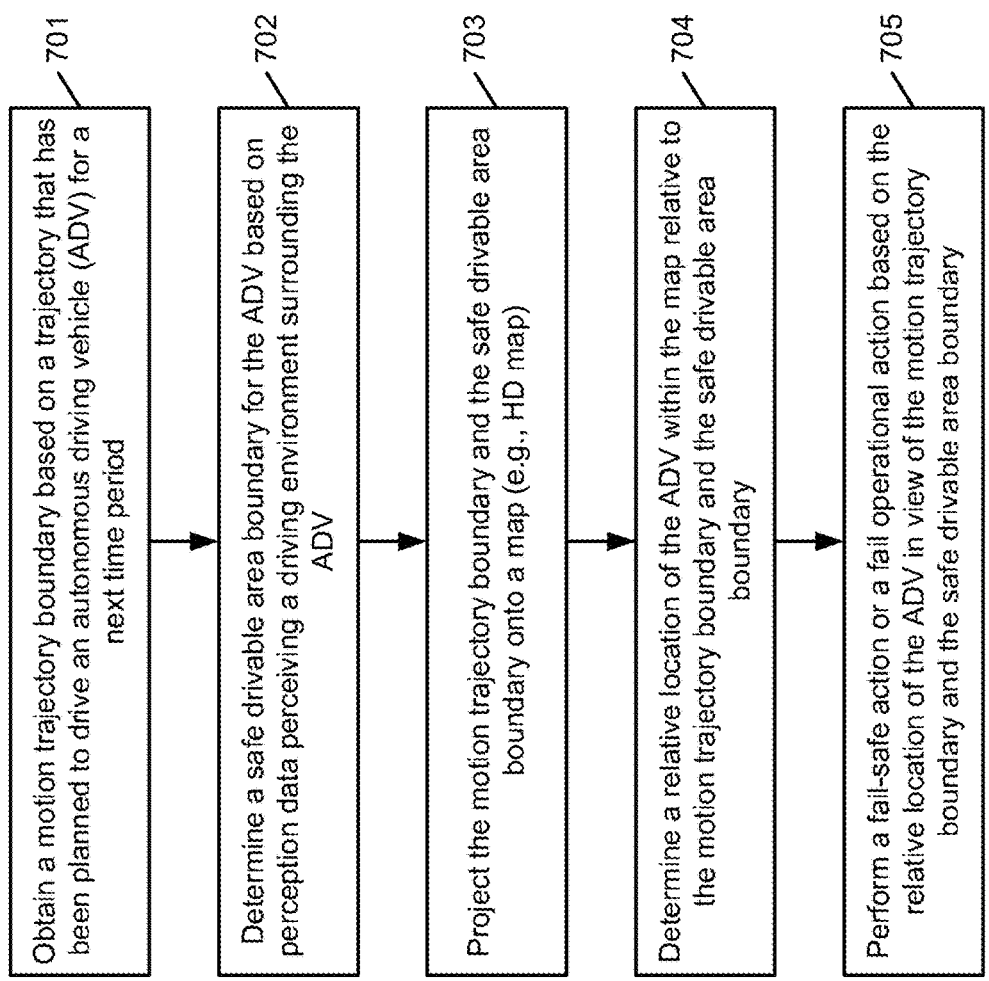
FIG. 7 is a flow diagram illustrating an example of a process of operating an autonomous driving vehicle according to one embodiment.

FIG. 7 is a flow diagram illustrating an example of a process for operating an ADV according to one embodiment. Process 700 may be performed by processing logic which may include software, hardware, or a combination thereof. For example, process 700 may be performed by control function monitor 308. Referring to FIG. 7, in operation 701, processing logic obtains a motion trajectory boundary based on a trajectory that has been planned to drive an ADV for a next time period. In operation 702, processing logic determines a safe drivable area boundary for the ADV based on perception data perceiving a driving environment surrounding the ADV. In operation 703, the motion trajectory boundary and the safe drivable area boundary are projected onto a map (e.g., HD map). In operation 704, a relative location of the ADV within the map relative to the motion trajectory boundary and the safe drivable area boundary. In operation 705, a fail-safe action or a fail operational action is performed based on the relative location of the ADV in view of the motion trajectory boundary and the safe drivable area boundary.

Figure 8:
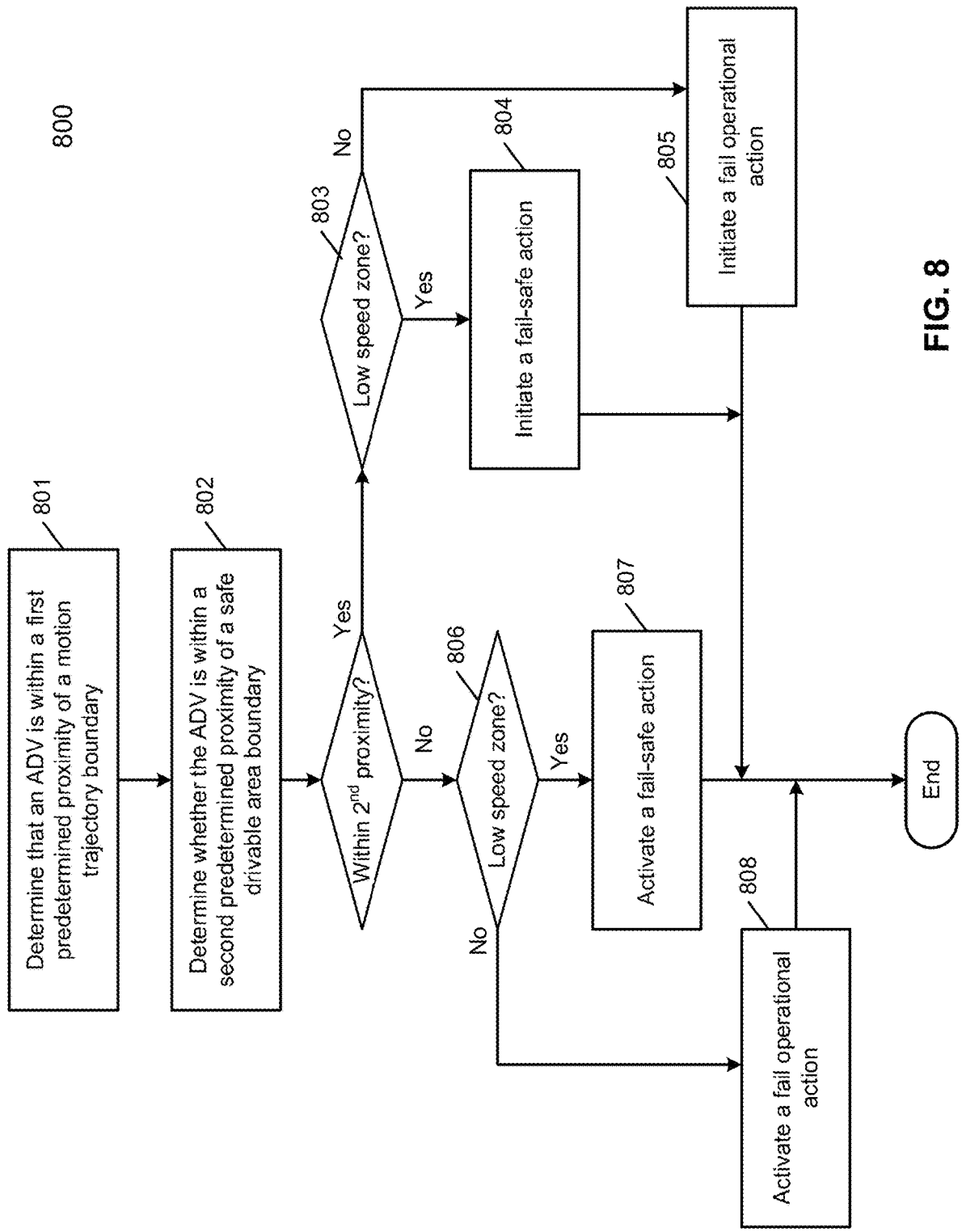
FIG. 8 is a flow diagram illustrating an example of a process of operating an autonomous driving vehicle according to one embodiment.

FIG. 8 is a flow diagram illustrating an example of a process for operating an ADV according to another embodiment. Process 800 may be performed as a part of operations 704-705. Referring to FIG. 8, in operation 801, processing logic determines that an ADV is within a first predetermined proximity of a motion trajectory boundary. In operation 802, processing logic determines whether the ADV is within a second predetermined proximity of a safe drivable area boundary. If it is determined the ADV is not within the second predetermined proximity of the safe drivable area boundary, in operation 803, it is determined whether the ADV is within a low speed zone. If the ADV is within the low speed zone, in operation 804, a fail-safe action is initiated; otherwise in operation 805, a fail operational action is initiated. On the other hand, if it is determined that the ADV is within the second predetermined proximity of the safe drivable area boundary, in operation 806, it is determine whether the ADV is within a low speed zone. If the ADV is within the low speed zone, in operation 807, a fail-safe action is activated; otherwise in operation 808, a fail operational action is activated.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   obtaining a motion trajectory boundary based on a trajectory that has been planned to drive an autonomous driving vehicle (ADV) for a next time period;

determining, while the ADV is driving forward, a safe drivable area boundary for the ADV based on perception data perceiving a driving environment surrounding the ADV, wherein the safe drivable area boundary defines an area around the ADV comprising:
- a first area extending backwards from the ADV a first distance based at least in part on a speed of the ADV and a speed of an object behind the ADV based on the perceiving of the driving environment surrounding the ADV, and
- a second area extending forwards from the ADV a second distance;

projecting the motion trajectory boundary and the safe drivable area boundary onto a map; and determining a relative location of the ADV within the map relative to the motion trajectory boundary and the safe drivable area boundary, wherein determining the relative location of the ADV within the map relative to the motion trajectory boundary and the safe drivable area boundary comprises:
- determining whether the ADV is within a first predetermined proximity of the motion trajectory boundary on the map,
- performing at least one of a fail-safe action or a fail operational action, in response to determining that the ADV is within the first predetermined proximity of the motion trajectory boundary,
- determining whether the ADV is within a second predetermined proximity of the safe drivable area boundary, in response to determining that the ADV is within the first predetermined proximity of the motion trajectory boundary, and
- in response to determining that the ADV is not within the second predetermined proximity, generating a warning signal to a primary autonomous driving system and transmitting a first signal to a secondary autonomous driving system to initiate at least one of the fail-safe action or the fail operational action.

2. The method of claim 1, wherein the motion trajectory boundary defines an area within which the ADV is expected to be located for the next time period if the ADV was driven according to the trajectory.

3. The method of claim 2, wherein the motion trajectory boundary is determined based on predicted movement of one or more obstacles within a predetermined proximity of the ADV in view of a current location and a current speed of the ADV according to a set of one or more driving rules.

4. The method of claim 1, wherein the safe drivable area boundary is determined based on a distance between the ADV and each of one or more obstacles identified based on the perception data according to a set of one or more safety clearance rules, wherein the one or more obstacles comprise a first obstacle behind the ADV and a second obstacle in front of the ADV.

5. The method of claim 4, wherein the safe drivable area boundary is determined further based on a lane configuration of one or more lanes of a road in which the ADV is located, the lane configuration is obtained based on map data of the map, and the area defined by the safe drivable area boundary comprises a third area extending sideways from the ADV a second distance into a lane of the lane configuration next to the ADV.

6. The method of claim 1, wherein transmitting a first signal to a secondary autonomous driving system to initiate at least one of the fail-safe action or the fail operational action comprises:
- determining whether the ADV is within a low speed zone based on a current location of the ADV and a lane configuration of one or more lanes of a road in which the ADV is located on the map;
- initiating the fail-safe action if the ADV is determined within the low speed zone; and
- initiating the fail operational action if the ADV is not within the low speed zone.

7. The method of claim 1, wherein in response to determining that the ADV is within the second predetermined proximity, the method further comprises:
- determining whether the ADV is within a low speed zone based on a current location of the ADV and a lane configuration of one or more lanes of a road in which the ADV is located on the map;
- transmitting a second signal to the secondary autonomous driving system to activate the fail-safe action if the ADV is determined within the low speed zone; and
- transmitting a third signal to the secondary autonomous driving system to activate the fail operational action if the ADV is not within the low speed zone.

8. The method of claim 1, wherein the fail-safe action comprises emergency braking when the first distance exceeds a threshold, and wherein the fail operational action comprises controlling the ADV to move according to an alternative trajectory.

9. The method of claim 1, wherein the motion trajectory boundary and the safe drivable area boundary are determined by a primary autonomous driving system, and wherein the fail-safe action and the fail operational action are performed by a secondary autonomous driving system serving as a standby system with respect to the primary autonomous driving system.

10. A non-transitory machine-readable medium having instructions stored therein, which when executed by a processor, cause the processor to perform operations, the operations comprising:
- obtaining a motion trajectory boundary based on a trajectory that has been planned to drive an autonomous driving vehicle (ADV) for a next time period;
- determining, while the ADV is driving forward, a safe drivable area boundary for the ADV based on perception data perceiving a driving environment surrounding the ADV, wherein the safe drivable area boundary defines an area around the ADV comprising:
  - a first area extending backwards from the ADV a first distance based at least in part on a speed of the ADV and a speed of an object behind the ADV based on the perceiving of the driving environment surrounding the ADV, and
  - a second area extending forwards from the ADV a second distance;
- projecting the motion trajectory boundary and the safe drivable area boundary onto a map; and
- determining a relative location of the ADV within the map relative to the motion trajectory boundary and the safe drivable area boundary, wherein determining the relative location of the ADV within the map relative to the motion trajectory boundary and the safe drivable area boundary comprises:
  - determining whether the ADV is within a first predetermined proximity of the motion trajectory boundary on the map,
  - performing at least one of a fail-safe action or a fail operational action, in response to determining that the ADV is within the first predetermined proximity of the motion trajectory boundary, determining whether the ADV is within a second predetermined proximity of the safe drivable area boundary, in response to determining that the ADV is within the first predetermined proximity of the motion trajectory boundary, and in response to determining that the ADV is not within the second predetermined proximity, generating a warning signal to a primary autonomous driving system and transmitting a first signal to a secondary autonomous driving system to initiate at least one of the fail-safe action or the fail operational action.

11. The machine-readable medium of claim 10, wherein the motion trajectory boundary defines an area within which the ADV is expected to be located for the next time period if the ADV was driven according to the trajectory.

12. The machine-readable medium of claim 11, wherein the motion trajectory boundary is determined based on predicted movement of one or more obstacles within a predetermined proximity of the ADV in view of a current location and a current speed of the ADV according to a set of one or more driving rules.

13. The machine-readable medium of claim 10, wherein the safe drivable area boundary is determined based on a distance between the ADV and each of one or more obstacles identified based on the perception data according to a set of one or more safety clearance rules, wherein the one or more obstacles comprise a first obstacle behind the ADV and a second obstacle in front of the ADV.

14. The machine-readable medium of claim 13, wherein the safe drivable area boundary is determined further based on a lane configuration of one or more lanes of a road in which the ADV is located, and wherein the lane configuration is obtained based on map data of the map.

15. A data processing system, comprising:
a processor; and
a memory coupled to the processor to store instructions, which when executed by the processor, cause the processor to perform operations, the operations including
obtaining a motion trajectory boundary based on a trajectory that has been planned to drive an autonomous driving vehicle (ADV) for a next time period,
determining, while the ADV is driving forward, a safe drivable area boundary for the ADV based on perception data perceiving a driving environment surrounding the ADV, wherein the safe drivable area boundary defines an area around the ADV comprising:
a first area extending backwards from the ADV a first distance based at least in part on a speed of the ADV and a speed of an object behind the ADV based on the perceiving of the driving environment surrounding the ADV, and
a second area extending forwards from the ADV a second distance, projecting the motion trajectory boundary and the safe drivable area boundary onto a map,
determining a relative location of the ADV within the map relative to the motion trajectory boundary and the safe drivable area boundary, wherein determining the relative location of the ADV within the map relative to the motion trajectory boundary and the safe drivable area boundary comprises:
determining whether the ADV is within a first predetermined proximity of the motion trajectory boundary on the map,
performing at least one of a fail-safe action or a fail operational action, in response to determining that the ADV is within the first predetermined proximity of the motion trajectory boundary,
determining whether the ADV is within a second predetermined proximity of the safe drivable area boundary, in response to determining that the ADV is within the first predetermined proximity of the motion trajectory boundary, and
in response to determining that the ADV is not within the second predetermined proximity, generating a warning signal to a primary autonomous driving system and transmitting a first signal to a secondary autonomous driving system to initiate at least one of the fail-safe action or the fail operational action.

16. The system of claim 15, wherein the motion trajectory boundary defines an area within which the ADV is expected to be located for the next time period if the ADV was driven according to the trajectory.

17. The system of claim 16, wherein the motion trajectory boundary is determined based on predicted movement of one or more obstacles within a predetermined proximity of the ADV in view of a current location and a current speed of the ADV according to a set of one or more driving rules.

18. The system of claim 15, wherein the safe drivable area boundary is determined based on a distance between the ADV and each of one or more obstacles identified based on the perception data according to a set of one or more safety clearance rules, wherein the one or more obstacles comprise a first obstacle behind the ADV and a second obstacle in front of the ADV.

19. The system of claim 15, wherein the fail-safe action comprises emergency braking when the first distance exceeds a threshold, and wherein the fail operational action comprises controlling the ADV to move according to an alternative trajectory.

20. The system of claim 15, wherein the motion trajectory boundary and the safe drivable area boundary are determined by a primary autonomous driving system, and wherein the fail-safe action and the fail operational action are performed by a secondary autonomous driving system serving as a standby system with respect to the primary autonomous driving system.

* * * * *